(12) United States Patent
Choi et al.

(10) Patent No.: US 8,929,026 B2
(45) Date of Patent: Jan. 6, 2015

(54) BASE FOR DISK DRIVING DEVICE

(71) Applicant: Samsung Electro-Mechanics Co., Ltd., Suwon (KR)

(72) Inventors: Tae Young Choi, Suwon (KR); Il Geun Jeon, Suwon (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 0 days.

(21) Appl. No.: 14/010,462

(22) Filed: Aug. 26, 2013

(65) Prior Publication Data

US 2014/0301175 A1    Oct. 9, 2014

(30) Foreign Application Priority Data

Apr. 5, 2013    (KR) .................... 10-2013-0037736
Jul. 4, 2013    (KR) .................... 10-2013-0078269

(51) Int. Cl.
*G11B 33/14*    (2006.01)
*G11B 33/12*    (2006.01)

(52) U.S. Cl.
CPC .................................... *G11B 33/124* (2013.01)
USPC ...................................................... 360/99.16

(58) Field of Classification Search
USPC ............... 360/99.16, 99.08, 99.12, 99.06
See application file for complete search history.

(56) References Cited

U.S. PATENT DOCUMENTS

| | | | |
|---|---|---|---|
| 6,389,869 B1 | 5/2002 | Wakita et al. | |
| 6,922,308 B1 * | 7/2005 | Butler | 360/99.18 |
| 8,125,741 B2 * | 2/2012 | Shelor | 360/294.4 |
| 2005/0046998 A1 * | 3/2005 | Hwang | 360/97.01 |
| 2009/0086377 A1 * | 4/2009 | Ohta et al. | 360/264.9 |

FOREIGN PATENT DOCUMENTS

| | | |
|---|---|---|
| JP | 2000-245122 A | 9/2000 |
| JP | 4552176 B2 | 7/2010 |
| KR | 10-2012-0058130 | 6/2012 |

OTHER PUBLICATIONS

Office Action dated Jun. 26, 2014 for corresponding Korean Patent Application No. 10-2013-0078269 and its English summary provided by Applicant's foreign counsel.

* cited by examiner

*Primary Examiner* — Allen T Cao
(74) *Attorney, Agent, or Firm* — Ladas & Parry, LLP

(57) ABSTRACT

A base for a disk driving device includes a first bottom part including a region for movement of a recording head; a second bottom part including a mounting region of a component of a voice coil motor; a third bottom part which becomes a mounting region of a pivot bearing unit; and a fourth bottom part forming a peripheral portion of the third bottom part. The second and third bottom parts are partitioned by a rigidity reinforcing part.

22 Claims, 7 Drawing Sheets

BASE FOR DISK DRIVING DEVICE

CROSS-REFERENCE TO RELATED APPLICATIONS

This application claims the priority of Korean Patent Application Nos. 10-2013-0037736 filed on Apr. 5, 2013 and 10-2013-0078269 filed on Jul. 4, 2013, in the Korean Intellectual Property Office, the disclosure of which is incorporated in their entireties herein by reference.

BACKGROUND

1. Technical Field

The present technology generally relates to a base for a disk driving device.

2. Description of the Related Art

Unless otherwise indicated herein, the materials described in this section are not prior art to the claims in this application and are not admitted to be prior art by inclusion in this section. A hard disk drive (HDD), an information storage device, reads data stored on a disk or writes data to a disk using a read/write head.

Such a hard disk drive requires a disk driving device capable of driving a disk. In the disk driving device, a small-sized spindle motor is commonly used. A disk may be mounted on the spindle motor to be rotated thereby.

A magnetic head may read data written on a disk or write data to a disk while being moved to a desired position above the disk by a swing arm including the magnetic head provided at a front end thereof. The swing arm may be rotatably supported by a pivot bearing unit and driven by a voice coil motor (VCM) installed at a rear end thereof.

Since the pivot bearing unit is installed on a base of the hard disk drive, a base seating surface is formed in parallel so that the pivot bearing unit is seated vertically with respect to the base.

Here, in the case of manufacturing the base using a die-casting method, the surface of the base on which the pivot bearing unit is seated may be finished using a cutting process.

However, in the case of manufacturing the base using a pressing method, since the base is formed by bending a steel plate, parallelism of the base seating surface may be significantly affected by a peripheral portion, such that it may not be easy to process the base seating surface in parallel.

Therefore, research into a pressed base capable of favorably affecting the base seating surface supporting the pivot bearing unit has been required.

A base formed of a stainless steel plate is disclosed in the following patent document.

RELATED ART DOCUMENT (Patent Document 1) Japanese Patent Laid-open Publication No. 2000-245122

SUMMARY

Some of embodiments of the present invention provide a pressed base for a disk driving device having a structure in which a base seating surface supporting a pivot bearing unit has favorable parallelism/positioning without being affected by a peripheral portion.

According to an aspect of some of the embodiments of the present invention, a base for a disk driving device may include a first bottom part including a region for movement of a recording head; a second bottom part including a mounting region for a component of a voice coil motor; a third bottom part which becomes a mounting region of a pivot bearing unit; and a fourth bottom part forming a peripheral portion of the third bottom part. The second and third bottom parts are preferably partitioned by a rigidity reinforcing part.

The rigidity reinforcing part may be formed as a groove to affect the transfer of vibrations at the time of driving the recording head.

A level of the third bottom part may be higher than that of the rigidity reinforcing part.

Levels of the third and second bottom parts may be lower than that of the first bottom part and may be substantially the same as each other.

The third bottom part may include a through hole formed therein so that a pivot shaft can be connected thereto.

A width of the groove may be less than a distance equal to half of a width of the third bottom part excepting the through hole.

A bottom surface of a base plate corresponding to the groove may be polished to be flat.

According to an aspect of some embodiments of the present invention, a base for a disk driving device may include a first bottom part including a region for movement of a recording head; a second bottom part including a mounting region for a component of a voice coil motor; a third bottom part which becomes a mounting region of a pivot bearing unit; and a fourth bottom part separating the second and third bottom parts from each other. The third bottom part may include a through hole formed therein so that a pivot shaft may be connected thereto. The shortest distance of the fourth bottom part separating the second and third bottom parts from each other may be less than a distance equal to half of a width of the third bottom part, excepting the through hole.

A level of the third bottom part may be higher than that of the fourth bottom part.

Levels of the third and second bottom parts may be lower than that of the first bottom part.

According to an aspect of some embodiments of the present invention, a base may form a housing of a hard disk drive and may be formed of a steel plate. The base may include a seating surface on which a pivot bearing unit of a head stack assembly is seated. The seating surface is formed to be at a higher level than a surface of a peripheral portion enclosing the seating surface.

The seating surface and the surface of the peripheral portion may be formed integrally with each other.

The seating surface and the surface of the peripheral portion may extend in parallel to each other.

At least some of the peripheral portion may be adjacent to a surface on which a magnet of a voice coil motor rotatably driving the head stack assembly is mounted.

The surface on which the magnet is mounted may be at a higher level than the surface of the peripheral portion.

The seating surface may include a through hole formed therein so that a pivot shaft coupled to a pivot unit may be connected thereto.

On a straight line corresponding to the shortest distance from the center of the through hole to a boundary between the surface on which the magnet is mounted and the surface of the peripheral portion, a length of the surface of the peripheral portion may be smaller than a half of a length of the straight line.

The seating surface, the surface of the peripheral portion, and the surface on which the magnet is mounted may be formed integrally with each other.

The seating surface, the surface of the peripheral portion, and the surface on which the magnet is mounted may extend in parallel to each other.

The pivot shaft may include a post having diameter smaller than that of the through hole and a jaw having a diameter larger than that of the through hole, the jaw being bonded to the seating surface.

BRIEF DESCRIPTION OF THE DRAWINGS

The embodiments of the present invention will be more clearly understood from the following detailed description taken in conjunction with the accompanying drawings, in which.

DETAILED DESCRIPTION OF THE EMBODIMENTS

Figure 1:
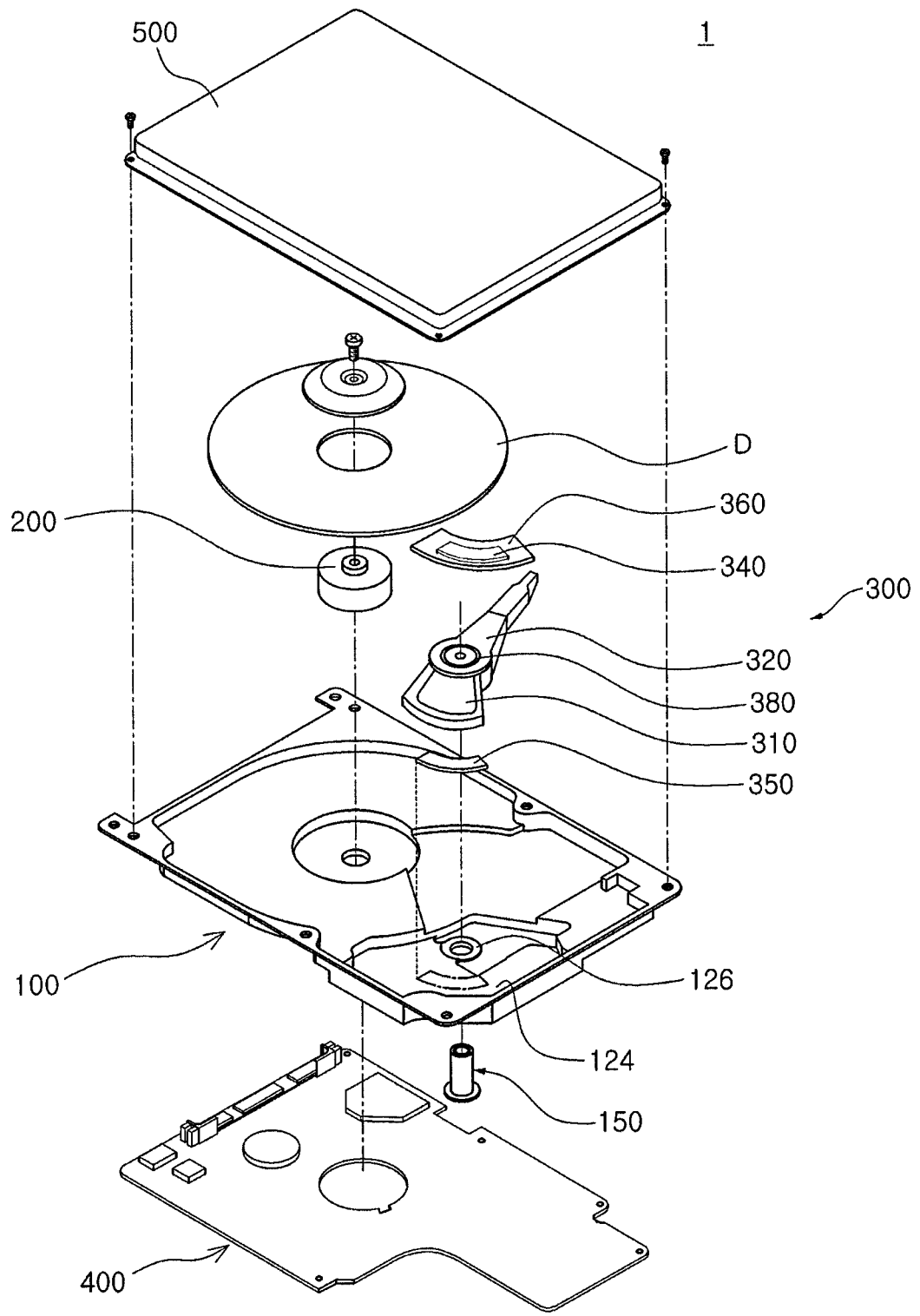
FIG. 1 is an exploded view showing a hard disk drive according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will convey the invention to those skilled in the art without undue experimentation. In the drawings, the shapes and dimensions of elements may be exaggerated for clarity, and the same reference numerals will be used throughout to designate the same or like elements. It will also be understood that, although the terms first, second, etc. may be used herein to describe various elements, these elements should not be limited by these terms. These terms are only used to distinguish one element from another. As used in the description of the invention and the appended claims, the singular forms "a", "an" and "the" are intended to include the plural forms as well, unless the context clearly indicates otherwise.

Disk Driving Device

FIG. 1 is an exploded view showing a hard disk drive according to an embodiment of the present invention.

Referring to FIG. 1, the hard disk drive 1 according to the embodiment of the present invention may include a base 100, a spindle motor 200, a head stack assembly 300, a substrate 400, and a cover 500.

The base 100 may be coupled to the cover 500 to form a housing of the hard disk drive 1.

Here, the base 100 may be formed by plastically deforming a steel plate. More specifically, after the basic shape of the base 100 is formed by press processing, a final shape thereof may be manufactured by bending, cutting, or additional processing.

That is, the base 100 according to the embodiment of the present invention may be manufactured by performing a single process by plastic processing such as press processing, or the like, or an additional process on a cold rolled steel sheet (SPCC, SPCE, or the like), a hot rolled steel sheet, a stainless steel, or a light weight alloy steel sheet such as a boron or magnesium alloy. This would preferably be unlike the post-processing scheme according to the related art in which aluminum (Al) is die-cast and flash, or the like, generated due to the die-casting is then removed.

Therefore, since the base 100 according to the embodiment of the present invention may be manufactured by press processing, processing time and cost may be reduced, whereby production capability may be improved.

Figure 2:
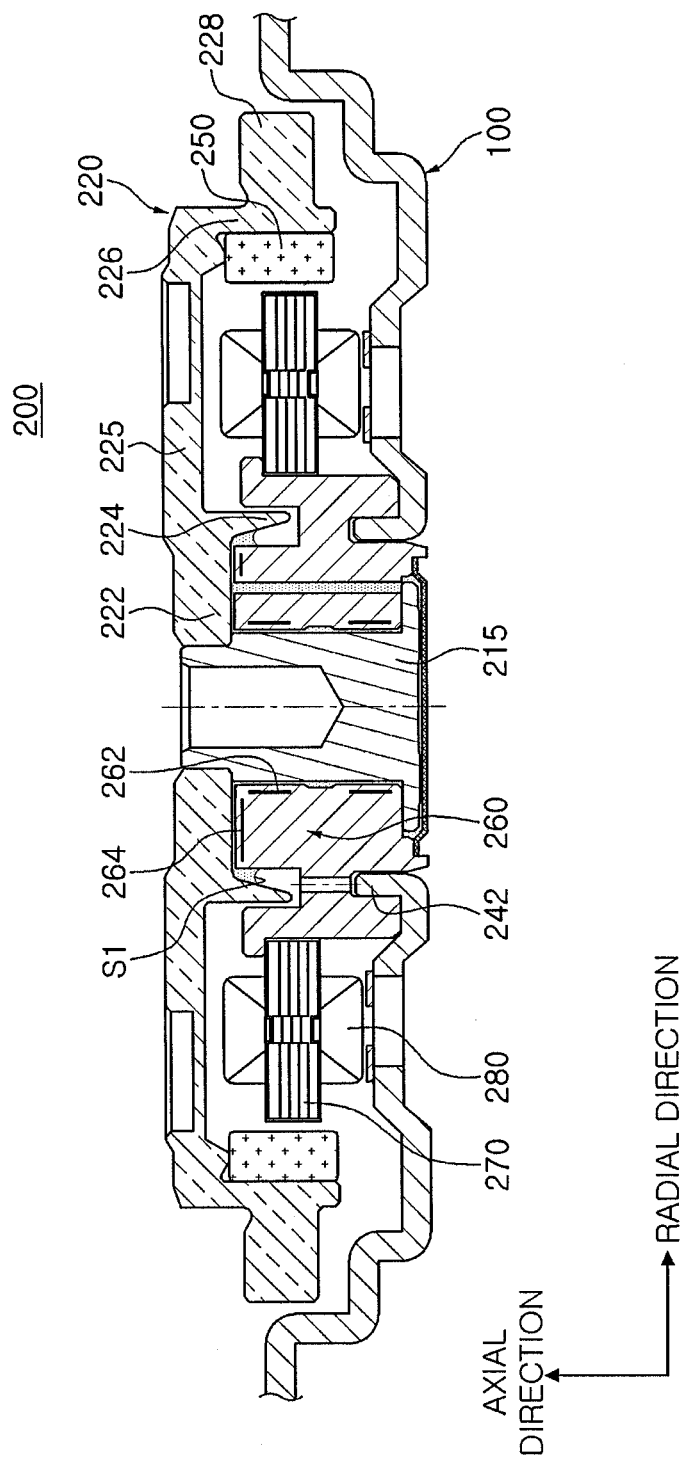
FIG. 2 is a cross-sectional view of a spindle motor according to an embodiment of the present invention.

FIG. 2 is a cross-sectional view of a spindle motor according to an embodiment of the present invention.

Referring to FIG. 2, the spindle motor 200 may include the base 100, a stator core 270, and a coil 280.

In addition, the spindle motor 200 may further include a sleeve 260 and a shaft 215.

Terms with respect to directions will first be defined. As viewed in FIG. 2, an axial direction refers to a vertical direction in which the shaft 215 is inserted into the sleeve 260, and a radial direction refers to a direction toward an outer edge of a rotor case 220 based on the center of the shaft 215 or a direction toward the center of the shaft 215 based on the outer edge of the rotor case 220.

FIG. 2 shows a rotating shaft structure in which the shaft 215 is rotatably inserted into the sleeve 260.

The shaft 215 may be inserted into the sleeve 260, and oil may be filled in a clearance between the shaft 215 and the sleeve 260.

The rotor case 220 may include a rotor hub 222 press-fitted in and fixed to an upper end of the shaft 215, a cover part 225 extends outwardly from the rotor hub 222 in the radial direction to cover the stator core 270, and a magnet supporting part 226 bent downwardly from the cover part 225 in the axial direction to support a magnet 250.

In addition, the magnet supporting part 226 may be provided with a disk supporting part 228 bent outwardly in the radial direction to support a disk.

The rotor case 220 may include a main wall part 224 protruding downwardly in the axial direction so that oil may be sealed between the main wall part 224 and an outer peripheral surface of the sleeve 260 in the radial direction.

A space between an inner peripheral surface of the main wall part 224 and the outer peripheral surface of the sleeve 260 may be tapered, and the oil may be sealed therein, such that an oil sealing part S1 may be formed.

FIG. 2 shows the rotating shaft structure in which the shaft 215 is rotatably inserted into the sleeve 260, but the present invention is not limited thereto. That is, a spindle motor having any structure including a fixed shaft structure may be included in the embodiment of the present invention.

Again, referring to FIG. 1, the head stack assembly 300 may include a swing arm 320 which rotates around a pivot shaft 150 and a voice coil motor provided opposite to the swing arm 320 so that a magnetic head may access data on a disk D.

The pivot shaft 150 may be installed on the base 100, and a pivot bearing unit 380 installed on the swing arm 320 may be rotatably coupled to the pivot shaft 150.

The voice coil motor may rotate the swing arm 320 by applying current to a coil 310 positioned between an upper magnet 340 and a lower magnet 350. The upper magnet 340 may include a yoke plate 360 attached thereto, but the lower magnet 350 generally will not include a yoke plate. The reason for this is that the base formed of the steel plate may serve as the yoke plate. Of course, the lower magnet 350 may include a yoke plate attached thereto. That is, the yoke plate may be attached to the base 100, and the lower magnet may be attached to the yoke plate.

When the swing arm 320 rotates, the magnetic head installed at the end portion of the swing arm 320 may search for a track while moving on the rotating disk D in the radial direction to access the data and process the accessed data as a signal.

First Embodiment of Base

Figure 3:
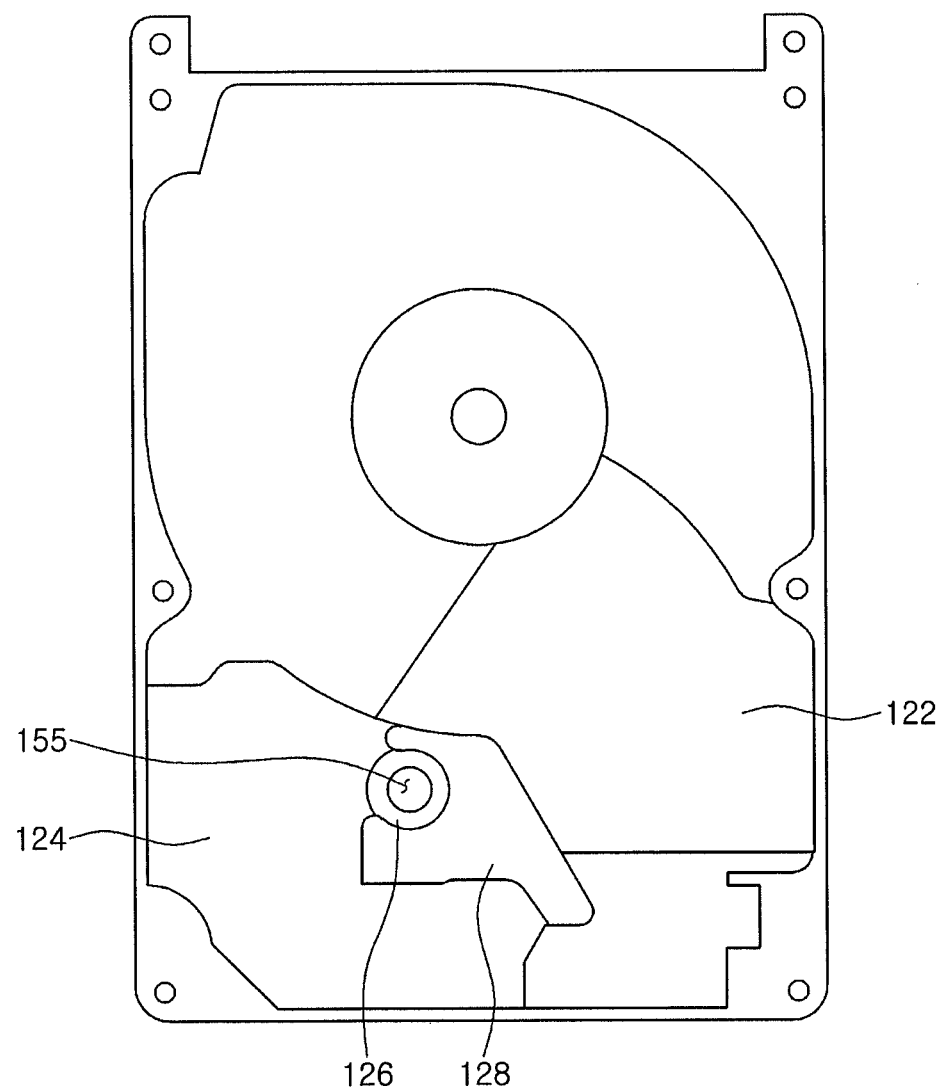
FIG. 3 is a plan view of a pressed base according to a first embodiment of the present invention.
Figure 4:
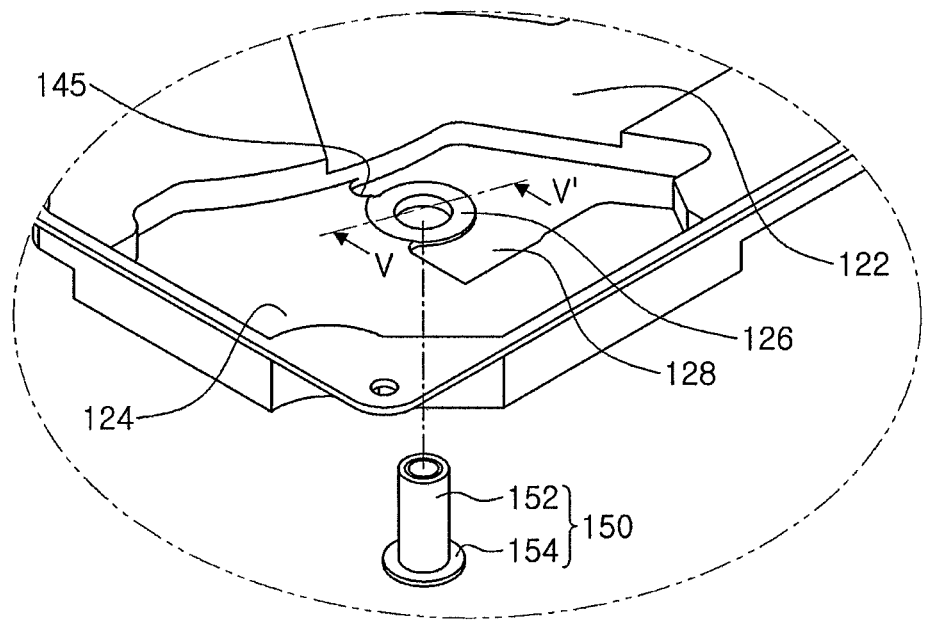
FIG. 4 is a partial perspective and exploded view of the pressed base of FIG. 3.
Figure 5:
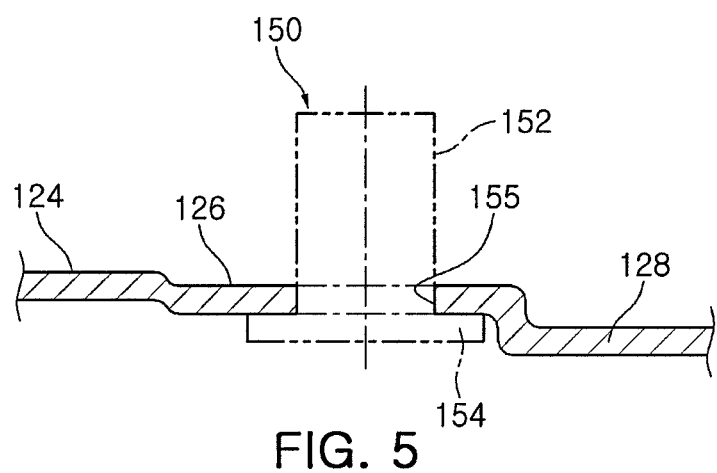
FIG. 5 is a cross-sectional view taken along line V-V' of FIG. 4.

FIG. 3 is a plan view of a pressed base 100 according to a first embodiment of the present invention, FIG. 4 is a partial perspective and exploded view of the pressed base 100 of FIG. 3, and FIG. 5 is a cross-sectional view taken along line V-V' of FIG. 4.

The base 100 for a disk driving device according to the first embodiment of the present invention may include a first bottom part 122 including a region for movement of the swing arm 320; a second bottom part 124 including a mounting region for the lower magnet 350 of the voice coil motor; a third bottom part 126 on which the pivot bearing unit 380 is seated, and a fourth bottom part 128 forming a peripheral portion of the third bottom part 126.

A through hole 155 penetrating through the base 100 may be formed in the third bottom part 126, and the pivot shaft 150 may be coupled to the through hole 155. The pivot shaft 150 may be configured of a post 152 and a jaw 154, and the jaw 154 may have a diameter larger than that of the through hole 155. When the pivot shaft 150 is inserted into the through hole 155 in the bottom surface of the third bottom part 126, the post 152 of the pivot shaft 150 may protrude from the upper surface of the third bottom part 126. The bottom surface of the third bottom part 126 and the upper surface of the jaw 154 of the pivot shaft 150 may be bonded to each other by a bonding method.

The bottom parts 122, 124, 126, and 128 may have different heights or levels relative to each other. For example, but not limited to, the first bottom part 122 may have a height or level higher than that of the second bottom part 124, the second bottom part 124 may have a height or level higher than that of the third bottom part 126, and the third bottom part 126 may have a height or level higher than that of the fourth bottom part 128.

The third bottom part 126 may not be positioned on the same plane as the second and fourth bottom parts 124 and 128 but may have a different height or level through the use of a step, such that parallelism of the third bottom part 126 is not affected by the second and fourth bottom parts 124 and 128 adjacent to the third bottom part 126 and may be independently controlled. That is, even though the parallelism of the third bottom part 126 may become distorted, since only the third bottom part 126 needs to be corrected, it may be easy to perform this correction.

Since the third bottom part 126 has a surface to which the pivot shaft 150 is coupled and on which the pivot bearing unit 380 is seated, the parallelism/positioning/shape/form of the third bottom part 126 vis a vis the pivot shaft 150 and pivot bearing 150 may be significant. These factors may be easily controlled by separating the third bottom part 126 from the remaining bottom parts adjacent thereto.

Second Embodiment of Base

Figure 6:
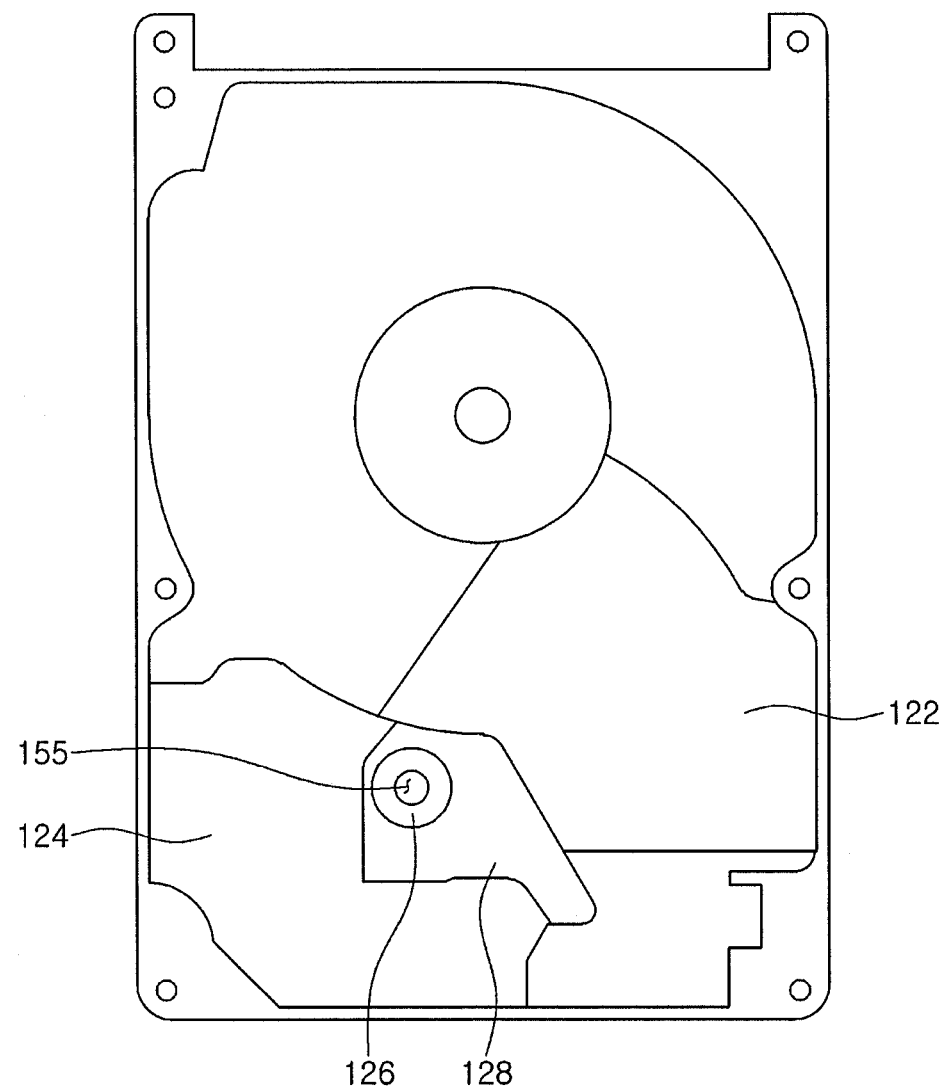
FIG. 6 is a plan view of a pressed base according to a second embodiment of the present invention.
Figure 7:
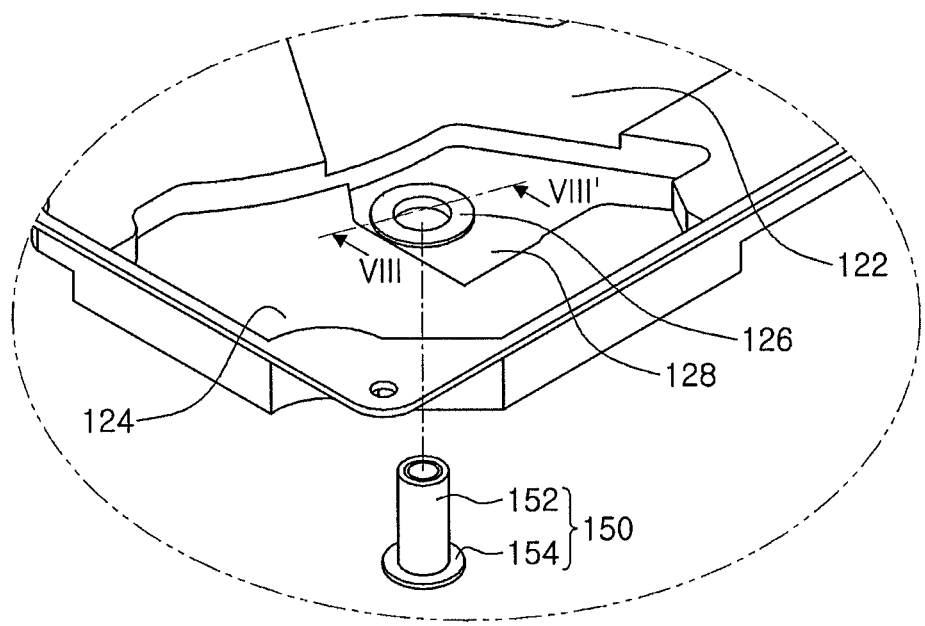
FIG. 7 is a partial perspective and exploded view of the pressed base of FIG. 6.
Figure 8:
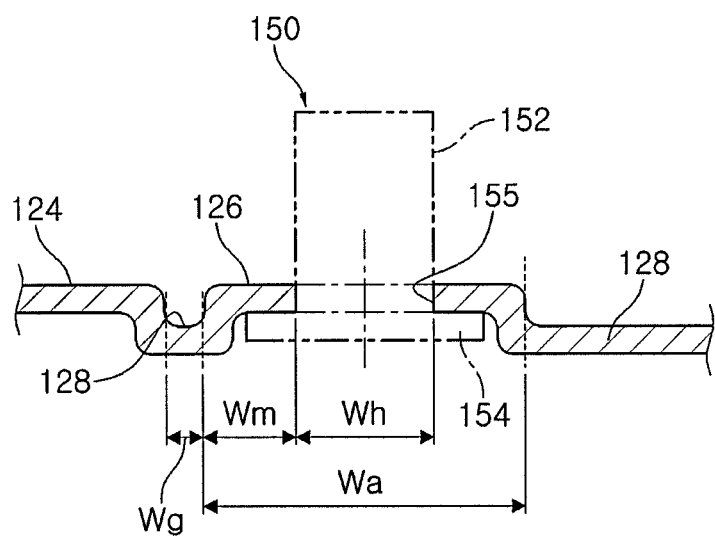
FIG. 8 is a cross-sectional view taken along line VIII-VIII' of FIG. 7.

FIG. 6 is a plan view of a pressed base according to a second embodiment of the present invention, FIG. 7 is a partial perspective and exploded view of the pressed base of FIG. 6, and FIG. 8 is a cross-sectional view taken along line VIII-VIII' of FIG. 7.

The base 100 for a disk driving device according to the second embodiment of the present invention may include a first bottom part 122 including a region for movement of the swing arm 320, a second bottom part 124 including a mounting region of the lower magnet 350 of the voice coil motor, a third bottom part 126 on which the pivot bearing unit 380 is seated, and a fourth bottom part 128 forming a peripheral portion of the third bottom part 126.

A through hole 155 penetrating through the base 100 may be formed in the third bottom part 126, and the pivot shaft 150 may be coupled to the through hole 155. The pivot shaft 150 may be configured of a post 152 and a jaw 154, and the jaw 154 may have a diameter larger than that of the through hole 155. When the pivot shaft 150 is inserted into the through hole 155 in the bottom surface of the third bottom part 126, the post 152 of the pivot shaft 150 may protrude from the upper surface of the third bottom part 126. The bottom surface of the third bottom part 126 and the upper surface of the jaw 154 of the pivot shaft 150 may be bonded to each other by a bonding method.

The first, second, and fourth bottom parts 122, 124, and 128 may have different heights or levels. For example, but not limited to, the first bottom part 122 may have a height or level higher than that of the second bottom part 124, and the second bottom part 124 may have a height or level higher than that of the fourth bottom part 128. The third bottom part 126 may have substantially the same or the same height or level as that of the second bottom part 124.

Unlike the first embodiment, the third bottom part 126 may be completely enclosed by the fourth bottom part 128. That is, the fourth bottom part 128 is present between the third and second bottom parts 126 and 124, such that the third bottom part 126 appears separated from the second bottom part 124.

As described above, the third bottom part 126 is present on the fourth bottom part 128 in the form of an island, such that the positioning of the third bottom part might not be affected by the remaining bottom parts but may be independently controlled. That is, even if the parallelism/positioning/shape of the third bottom part 126 is distorted, since only the third bottom part 126 needs to be corrected, it may be easy to perform the correction.

Since the third bottom part 126 has a surface to which the pivot shaft 150 is coupled and on which the pivot bearing unit 380 is seated, the parallelism/positioning/shape of the third bottom part 126 may be important. The parallelism may be controlled by separating the third bottom part 126 from remaining bottom parts adjacent thereto by the use of a groove like formation.

In the base according to the second embodiment, since the third bottom part 126 is somewhat separated from the second bottom part 124 through the use of a groove like formation, as compared to the base according to the first embodiment in which the second and third bottom parts 124 and 126 are stepped away from each other, the parallelism/positioning/shape of the third part may be more readily controlled.

Referring to FIG. 8, the shortest distance of the fourth bottom part 128 separating the second and third bottom parts 124 and 126 from each other is represented by Wg, the width (diameter) of the through hole 155 is represented by Wh, and the total width of the third bottom part 126 is represented by Wa. Here, a half of a value obtained by subtracting the width Wh of the through hole 155 from the total width of the third bottom part 126 is represented by Wm.

As shown in FIG. 8, preferably, Wg may be smaller than Wm. In the case in which Wg is large, the third bottom part 126 is far away from the second bottom part 124 and positioned at the center of the fourth bottom part 128, such that the third bottom part 126 may have a structure vulnerable to external impact. In the case in which a strong impact is applied to the hard disk drive, the parallelism/positioning/shape of the third bottom part 126 may be negatively affected due to deformation of the base caused by the impact. Since a defect in the parallelism/positioning/shape of the third bottom part 126 may directly affect postures/positioning of the swing arm and the head, this may cause a defect in the hard disk drive. By comparison, in the case in which Wg is small, a groove for reinforcing rigidity enclosing a peripheral portion of the third bottom part 126 is formed, such that the third bottom part may be more structurally sound and more resistant to external impacts, thereby making it possible to better protect the third bottom part 126 from being deformed by external impacts and external forces applied thereto.

Figure 9:
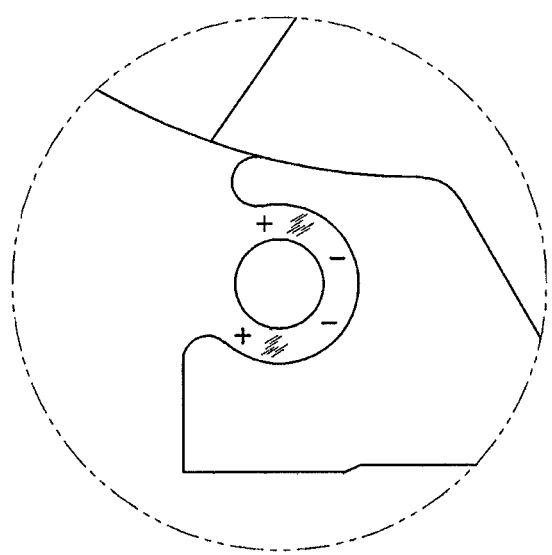
FIG. 9 is a schematic partial view of a pressed base according to another embodiment of the present invention.

FIG. 9 is a schematic partial view of a pressed base according to another embodiment of the present invention.

Referring to FIG. 9, in view of the base seating surface of the pivot bearing unit, when the base seating surface is press-processed, a seating surface (represented by +) of which a peripheral portion thereof is raised may be high, and a seating surface (represented by −) at which a peripheral portion thereof is depressed may be low, such that, overall, the parallelism/shaping/positioning of the seating surface may be problematic.

As set forth above, by using the pressed base for a disk driving device, the parallelism/positioning/shaping of the base seating surface supporting the pivot bearing unit may be better controlled and may be a more independent structure.

While the present invention has been shown and described in connection with the embodiments, it will be apparent to those skilled in the art that modifications and variations can be made without departing from the spirit and scope of the invention as defined by the appended claims. Accordingly, the illustrative discussions above are not intended to be exhaustive or to limit the invention to the precise forms disclosed.

What is claimed is:

1. A base for a disk driving device comprising:
a first part including a region for moving a recording head;
a second part including a region for mounting a component of a voice coil motor; and
a third part including a region for mounting a pivot bearing unit,
wherein the second and third parts are partitioned by a part for reinforcing rigidity.

2. The base for a disk driving device of claim 1, wherein the part for reinforcing rigidity is a groove.

3. The base for a disk driving device of claim 1, wherein the part for reinforcing rigidity is configured to act against the transfer of vibration.

4. The base for a disk driving device of claim 1, wherein a level of the third part is higher than that of the part for reinforcing rigidity.

5. The base for a disk driving device of claim 1, wherein at least one of levels of the third and second parts is lower than that of the first part.

6. The base for a disk driving device of claim 2, wherein a level of the second part is substantially the same as that of third part.

7. The base for a disk driving device of claim 2, wherein: the third part includes a through hole formed therein for connection to a pivot shaft, and is associated with the groove, the width of the groove being less than a distance equal to half of a width of the third part excepting the through hole.

8. The base for a disk driving device of claim 2, wherein a bottom surface of a base plate corresponding to the groove is polished flat.

9. The base for a disk driving device of claim 1, further comprising a fourth part forming a peripheral portion of the third part.

10. A base for a disk driving device comprising:
a first part including a region for mounting a component of a voice coil motor;
a second part including a region for mounting a pivot bearing unit; and
a third part separating the first and second parts from each other,
wherein:
the second part includes a through hole formed therein for connection to a pivot shaft, and
a shortest width of the third part is less than a distance equal to half of a width of the second part excepting the through hole.

11. The base for a disk driving device of claim 10, wherein a level of the second part is higher than that of the third part.

12. The base for a disk driving device of claim 10, further comprising a fourth part having a region for moving a recording head,
wherein at least one of the levels of the first and second parts is lower than that of the fourth part.

13. A base forming a housing of a hard disk drive and formed of a plate, the base comprising:
a seating surface on which a pivot bearing unit of a head stack assembly is seated,
wherein the seating surface is formed to be at a higher level than a surface of a peripheral portion enclosing the seating surface.

14. The base for a disk driving device of claim 13, wherein the seating surface and the surface of the peripheral portion are formed integrally with each other.

15. The base for a disk driving device of claim 13, wherein the seating surface and the surface of the peripheral portion extend in parallel with each other.

16. The base for a disk driving device of claim 13, wherein at least some of the peripheral portion is adjacent to a surface on which a magnet of a voice coil motor rotatably driving the head stack assembly is mounted.

17. The base for a disk driving device of claim 16, wherein the surface on which the magnet is mounted is at a higher level than the surface of the peripheral portion.

18. The base for a disk driving device of claim 17, wherein the seating surface includes a through hole formed therein for connection to a pivot.

19. The base for a disk driving device of claim 18, wherein on a straight line corresponding to a shortest distance from a center of the through hole to a boundary between the surface on which the magnet is mounted and the surface of the peripheral portion, a length of the surface of the peripheral portion is smaller than a half of a length of the straight line.

20. The base for a disk driving device of claim 16, wherein the seating surface, the surface of the peripheral portion, and the surface on which the magnet is mounted are formed integrally with each other.

21. The base for a disk driving device of claim 16, wherein the seating surface, the surface of the peripheral portion, and the surface on which the magnet is mounted extend parallel to each other.

22. The base for a disk driving device of claim 18, wherein the pivot shaft includes a post having a diameter smaller than that of the through hole and a jaw having a diameter larger than that of the through hole, the jaw being bonded to the seating surface.

* * * * *